(12) United States Patent
Mansfield et al.

(10) Patent No.: US 9,534,939 B2
(45) Date of Patent: Jan. 3, 2017

(54) FLAMEPROOF ELECTRICAL FEED-THROUGH

(75) Inventors: William M Mansfield, Niwot, CO (US); Craig B McAnally, Thornton, CO (US); Shaun E Shanahan, Denver, CO (US); Richard L Woolf, Mead, CO (US)

(73) Assignee: Micro Motion, Inc., Boulder, CO (US)

( * ) Notice: Subject to any disclaimer, the term of this patent is extended or adjusted under 35 U.S.C. 154(b) by 0 days.

(21) Appl. No.: 14/396,252

(22) PCT Filed: May 17, 2012

(86) PCT No.: PCT/US2012/038419
§ 371 (c)(1),
(2), (4) Date: Oct. 22, 2014

(87) PCT Pub. No.: WO2013/172846
PCT Pub. Date: Nov. 21, 2013

(65) Prior Publication Data
US 2015/0129300 A1 May 14, 2015

(51) Int. Cl.
*H02G 3/18* (2006.01)
*G01F 1/68* (2006.01)
(Continued)

(52) U.S. Cl.
CPC .............. *G01D 11/24* (2013.01); *G01F 1/8409* (2013.01); *G01F 15/00* (2013.01); *H01R 43/005* (2013.01);
(Continued)

(58) Field of Classification Search
CPC ..... H02G 15/113; H01R 13/527; H01R 13/52; G01D 11/24; G01D 11/245; G01F 1/84–1/8495
(Continued)

(56) References Cited

U.S. PATENT DOCUMENTS

| 3,779,078 A | * | 12/1973 | Kaesser | G01K 1/14 174/152 R |
| 4,768,385 A | * | 9/1988 | Cage | G01F 1/8413 73/861.355 |

(Continued)

FOREIGN PATENT DOCUMENTS

| EP | 1130363 A1 | 9/2001 |
| EP | 0929081 B1 | 7/2003 |

(Continued)

OTHER PUBLICATIONS

Definition of "machine" from www.dictionary.reference.com Feb. 23, 2016.*

*Primary Examiner* — Chau N Nguyen
*Assistant Examiner* — Roshn Varghese
(74) *Attorney, Agent, or Firm* — The Ollila Law Group LLC

(57) ABSTRACT

A flameproof feed-through (200) includes a feed-through element (210) comprising a substantially planar shape, a first interface region (211), and a second interface region (212), wherein one or more conductors (217) extend between the first interface region (211) and the second interface region (212). The flameproof feed-through (200) further includes one or more body portions (220) assembled to the feed-through element (210), with the one or more body portions (220) holding the feed-through element (210) in position with respect to the aperture. The first interface region (211) of the feed-through element (210) extends at least partially to a first side (201) of the flameproof feed-through (200) and wherein the second interface region (212) of the feed-through element (210) extends at least partially to a second side (202) of the flameproof feed-through (200).

18 Claims, 7 Drawing Sheets

(51) Int. Cl.
*G01D 11/24* (2006.01)
*G01F 1/84* (2006.01)
*G01F 15/00* (2006.01)
*H01R 43/00* (2006.01)
*H02G 3/08* (2006.01)
*H02G 3/22* (2006.01)

(52) U.S. Cl.
CPC ............... *H02G 3/08* (2013.01); *H02G 3/22* (2013.01); *Y10T 29/49117* (2015.01); *Y10T 29/49124* (2015.01)

(58) Field of Classification Search
USPC ........ 174/650, 652, 656, 658, 669; 361/757; 73/204.22
See application file for complete search history.

(56) References Cited

U.S. PATENT DOCUMENTS

| | | | | |
|---|---|---|---|---|
| 4,972,708 A | * | 11/1990 | Wiegleb | G01P 5/12 73/204.22 |
| 5,399,807 A | * | 3/1995 | Yarbrough | H02G 3/22 174/653 |
| 6,055,160 A | * | 4/2000 | Schmidt | H01B 17/30 361/742 |
| 6,286,373 B1 | * | 9/2001 | Lister | G01F 1/8409 73/861.355 |
| 6,519,828 B1 | * | 2/2003 | Cook | G01F 1/8413 73/861.355 |
| 6,556,447 B2 | | 4/2003 | Cudini et al. | |
| 6,627,817 B1 | * | 9/2003 | Kortenbach | H02G 3/083 174/541 |
| 6,841,733 B2 | * | 1/2005 | Schiaffino | G02B 6/42 174/650 |
| 6,844,502 B2 | | 1/2005 | Deng et al. | |
| 8,106,312 B2 | * | 1/2012 | Shinoda | H05K 5/069 174/554 |
| 2001/0053065 A1 | | 12/2001 | Cudini et al. | |
| 2005/0211466 A1 | * | 9/2005 | Kayser | G01D 11/245 174/261 |
| 2006/0016273 A1 | | 1/2006 | Bitto et al. | |
| 2007/0279877 A1 | * | 12/2007 | Dobritz | H05K 1/117 174/260 |
| 2010/0118901 A1 | | 5/2010 | Newman et al. | |
| 2011/0056745 A1 | | 3/2011 | Crisfield et al. | |
| 2011/0275246 A1 | * | 11/2011 | Kooiman | H01R 9/038 439/620.22 |
| 2011/0297417 A1 | * | 12/2011 | Zhang | H02G 3/083 174/102 D |

FOREIGN PATENT DOCUMENTS

| | | |
|---|---|---|
| EP | 2339708 A2 | 6/2011 |
| FR | 2825841 A1 | 12/2002 |
| JP | 2011-9390 A1 | 1/2011 |
| WO | 9923725 A1 | 5/1999 |

\* cited by examiner

FLAMEPROOF ELECTRICAL FEED-THROUGH

BACKGROUND OF THE INVENTION

1. Field of the Invention

The present invention relates to a flameproof feed-through, and more particularly, to a flameproof feed-through providing control of impedance.

2. Statement of the Problem

Vibrating conduit sensors, such as Coriolis mass flowmeters and vibrating densitometers, typically operate by detecting motion of a vibrating conduit that contains a flowing material. Properties associated with the material in the conduit, such as mass flow, density and the like, can be determined by processing measurement signals received from motion transducers associated with the conduit. The vibration modes of the vibrating material-filled system generally are affected by the combined mass, stiffness and damping characteristics of the containing conduit and the material contained therein.

A typical Coriolis mass flowmeter includes one or more conduits that are connected inline in a pipeline or other transport system and convey material, e.g., fluids, slurries, emulsions, and the like, in the system. Each conduit may be viewed as having a set of natural vibration modes, including for example, simple bending, torsional, radial, and coupled modes. In a typical Coriolis mass flow measurement application, a conduit is excited in one or more vibration modes as a material flows through the conduit, and motion of the conduit is measured at points spaced along the conduit. Excitation is typically provided by an actuator, e.g., an electromechanical device, such as a voice coil-type driver, that perturbs the conduit in a periodic fashion. Mass flow rate may be determined by measuring time delay or phase differences between motions at the transducer locations. Two such transducers (or pickoff sensors) are typically employed in order to measure a vibrational response of the flow conduit or conduits, and are typically located at positions upstream and downstream of the actuator. The two pickoff sensors are connected to electronic instrumentation. The instrumentation receives signals from the two pickoff sensors and processes the signals in order to derive a mass flow rate measurement, among other things. Vibratory flowmeters, including Coriolis mass flowmeters and densitometers, therefore employ one or more flow tubes that are vibrated in order to measure a fluid.

In some environments, electrical signals may need to be conducted through a flameproof physical barrier. For example, a flameproof physical barrier may separate the compartments of a fieldmount transmitter housing. Process control transmitters designed for use in hazardous atmospheres often utilize a combination of protection methods, including flameproof housings and/or barriers, to avoid uncontrolled explosions of flammable gases. International standards define the compliance requirements for flameproof devices and structures.

In the case of Coriolis flowmeter transmitters, it is well known to enclose the active electronics components within a flameproof compartment, so that an explosion of gases that might occur as a result of electrical energy within the electronics will not propagate beyond the enclosure. Furthermore, it is sometimes preferred that user-accessible connection facilities of the electronics utilize "increased safety" rather than flameproof as a protection method, wherein the connection facilities are shown to be non-sparking and therefore incapable of igniting a flammable gas. Under either standard, active electronics which could cause ignition are contained in a compartment wherein any ignition within the compartment cannot escape the compartment.

In order to provide electrical connectivity between the two compartments, a flameproof feed-through is employed. A common prior art flameproof feed-through is a cemented joint bushing. In a cemented joint bushing, a cemented joint may be formed between the conductors and the bushing casing or a cemented joint may be formed between a conductor insulation layer and the bushing casing. In a non-cemented joint, a small-tolerance interface may be used between the bushing casing and compartment wall, including joint interfaces to threaded, spigot, and other bushing casings. In order to be approved as flameproof, both types of joints must meet specific requirements, such as a temperature index rating and chemical compatibility, exceedingly tight tolerances (such as on the order of 0.1 or 0.15 millimeter, for example), and thread count, depth, and tolerance on a threaded joint.

FIG. 2 shows a prior art spigot-type feed-through. Wires, pins, or other conductors are cast into and pass through a feed-through body. A circumferential surface of the spigot-type feed-through body substantially contacts the inner surface of the aperture to form what is termed a spigot joint. A gap, and therefore a flame path, exists between the outer surface of the body and the inner surface of the aperture. The spigot-type feed-through body must achieve a minimal gap so that an unacceptably large gap and unacceptably short flame path are not allowed to exist.

The spigot-type feed-through body may comprise a potting material, such as a plastic. The potting material may be formed in the shape of the aperture and allowed to cure or harden before being assembled into the aperture as a spigot joint feed-through.

FIG. 3 shows a prior art flange-type feed-through. A flange-type feed-through body is positioned over and blocks an aperture. The flange-type feed-through body is larger than the aperture and overlaps the aperture. A gap and flame path comprises a radially directed path, extending outward from the axis between the flange-type feed-through body and an external surface of the barrier, housing, or other structure including the aperture.

All these approaches share certain disadvantages. First, the presence of discrete conductors presents a limitation on the ability to control the characteristic impedance of the electrical connections. As a result, the signal frequency that the connections can effectively carry is limited by the impedance of the prior art feed-through. Second, the process of manufacturing a feed-through involves the application and curing of cement or the need for a plastic over-molding process in order to form the physical barrier around the discrete conductors. These steps increase manufacturing time, complexity, and cost when creating an acceptable prior art flameproof feed-through.

ASPECTS OF THE INVENTION

In one aspect of the invention, a flameproof feed-through adapted for use with an aperture comprises:
   a feed-through element comprising a substantially planar shape, a first interface region, and a second interface region, wherein one or more conductors extend between the first interface region and the second interface region; and one or more body portions assembled to the feed-through element, with the one or more body portions holding the feed-through element in position with respect to the aperture;

wherein the first interface region of the feed-through element extends at least partially to a first side of the flameproof feed-through and wherein the second interface region of the feed-through element extends at least partially to a second side of the flameproof feed-through.

Preferably, the feed-through element comprises a printed circuit board (PCB).

Preferably, the one or more conductors comprise one or more internal or external conductors.

Preferably, the feed-through element provides a predetermined impedance characteristic for the one or more conductors.

Preferably, the feed-through element is machined to a predetermined profile tolerance.

Preferably, the one or more body portions comprise two or more body portions and feed-through edges of the feed-through element are machined to be substantially flush with circumferential surfaces of the two or more body portions.

Preferably, the one or more body portions comprise two or more body portions clamping against the feed-through element to form a spigot-type joint, with circumferential surfaces of the two or more body portions and with feed-through edges of the feed-through element being machined to a predetermined perimeter size and shape to create a substantially flameproof interface between the flameproof feed-through and the aperture.

Preferably, the one or more body portions comprise two or more body portions clamping against the feed-through element to form a spigot-type joint, with circumferential surfaces of the two or more body portions and with feed-through edges of the feed-through element being machined to a predetermined perimeter size and shape to create a substantially flameproof interface between the flameproof feed-through and the aperture, and with the feed-through element being machined to a predetermined profile tolerance to create a substantially flameproof interface between the feed-through element and the two or more body portions.

Preferably, the one or more body portions comprise a single body portion and the feed-through element is machined to a predetermined profile tolerance, wherein a substantially flameproof flange-type interface is created between the single body portion, the feed-through element, and a surface surrounding the aperture.

In one aspect of the invention, a method of forming a flameproof feed-through adapted for use with an aperture comprises:
providing a feed-through element comprising a substantially planar shape, a first interface region, and a second interface region, wherein one or more conductors extend between the first interface region and the second interface region; and
assembling one or more body portions to the feed-through element, with the one or more body portions holding the feed-through element in position with respect to the aperture;
wherein the first interface region of the feed-through element extends at least partially to a first side of the flameproof feed-through and wherein the second interface region of the feed-through element extends at least partially to a second side of the flameproof feed-through.

Preferably, the feed-through element comprises a printed circuit board (PCB).

Preferably, the one or more conductors comprising one or more internal or external conductors.

Preferably, the feed-through element provides a predetermined impedance characteristic for the one or more conductors.

Preferably, further comprising machining the feed-through element to a predetermined profile tolerance.

Preferably, the one or more body portions comprise two or more body portions and feed-through edges of the feed-through element are machined to be substantially flush with circumferential surfaces of the two or more body portions.

Preferably, the one or more body portions comprise two or more body portions and with the assembling further comprising clamping the two or more body portions against the feed-through element to form a spigot-type joint, and machining circumferential surfaces of the two or more body portions and feed-through edges of the feed-through element to a predetermined perimeter size and shape to create a substantially flameproof interface between the flameproof feed-through and the aperture.

Preferably, the one or more body portions comprise two or more body portions and with the assembling further comprising machining the feed-through element to a predetermined profile tolerance to create a substantially flameproof interface between the feed-through element and the two or more body portions, clamping the two or more body portions against the feed-through element to form a spigot-type joint, and machining circumferential surfaces of the two or more body portions and feed-through edges of the feed-through element to a predetermined perimeter size and shape to create a substantially flameproof interface between the flameproof feed-through and the aperture.

Preferably, the one or more body portions comprise a single body portion and with the method further comprising machining the feed-through element to a predetermined profile tolerance, wherein a substantially flameproof flange-type interface is created between the single body portion, the feed-through element, and a surface surrounding the aperture.

DESCRIPTION OF THE DRAWINGS

The same reference number represents the same element on all drawings. The drawings are not necessarily to scale.

FIG. 2 shows a prior art spigot-type feed-through.

FIG. 3 shows a prior art flange-type feed-through.

DETAILED DESCRIPTION OF THE INVENTION

FIGS. 3-8 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
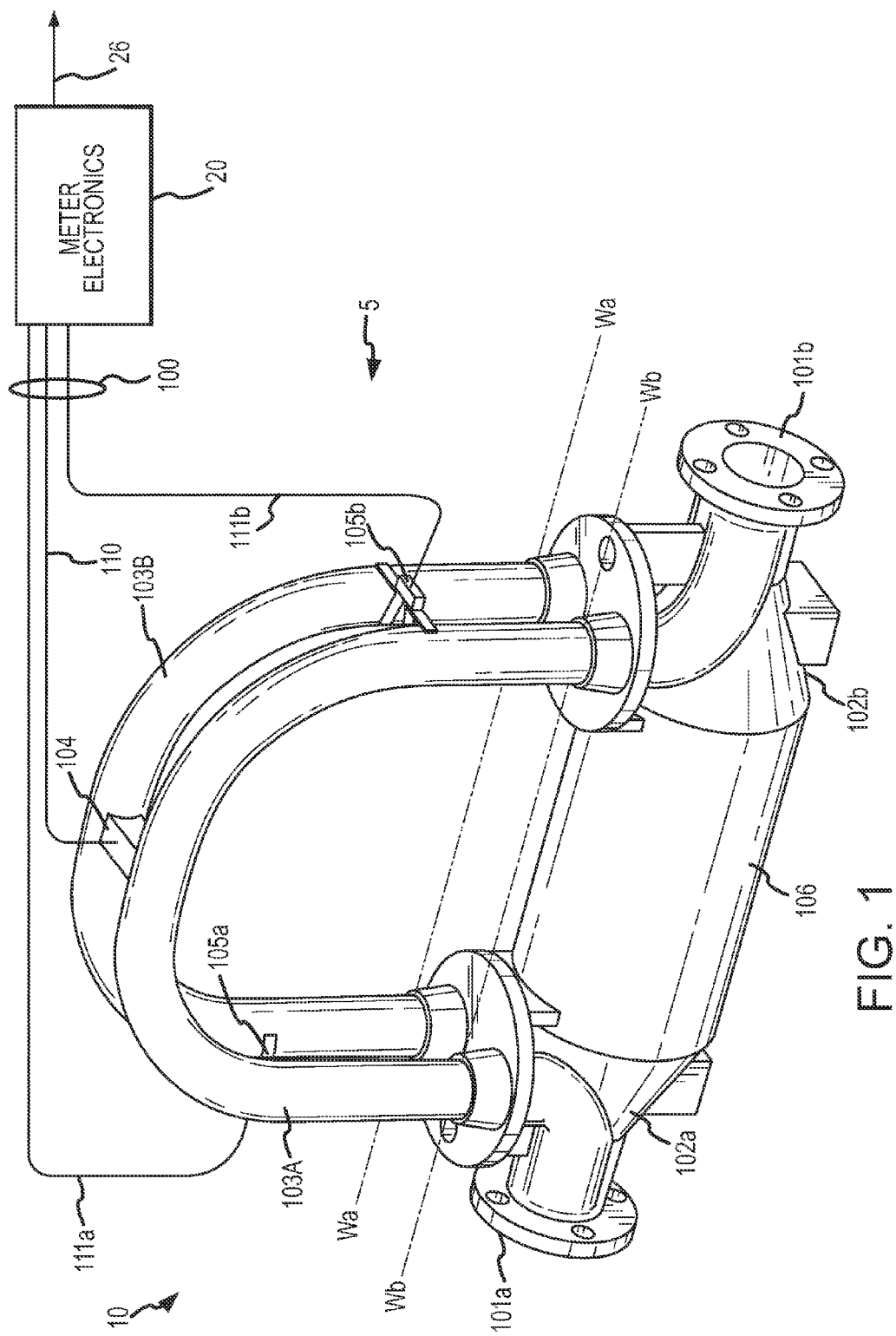
FIG. 1 shows a vibratory flowmeter according to an embodiment of the invention.
Figure 2:
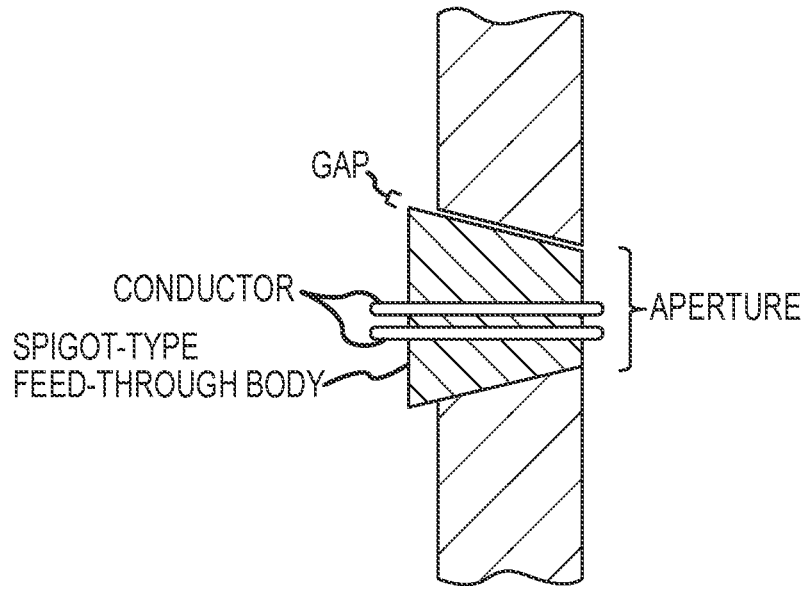
Figure 3:
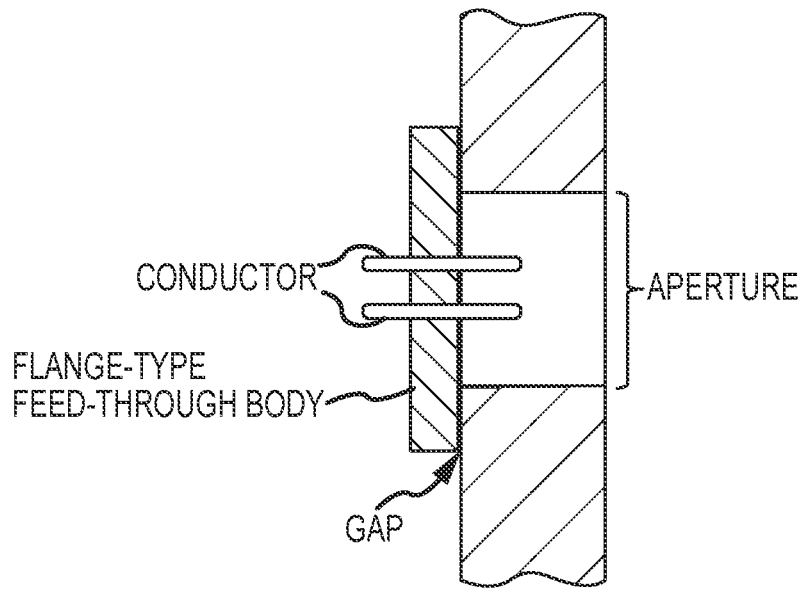

FIG. 1 shows a vibratory flowmeter 5 according to the invention. The vibratory flowmeter 5 comprises a flowmeter assembly 10 and meter electronics 20. The meter electronics 20 is connected to the meter assembly 10 via leads 100 and is configured to provide measurements of one or more of a density, mass flow rate, volume flow rate, totalized mass flow, temperature, or other measurements or information over a communication path 26. It should be apparent to those skilled in the art that the vibratory flowmeter 5 can comprise any manner of vibratory flowmeter, regardless of the number of drivers, pick-off sensors, flow conduits, or the operating mode of vibration. In some embodiments, the vibratory flowmeter 5 can comprise a Coriolis mass flowmeter. In addition, it should be recognized that the vibratory flowmeter 5 can alternatively comprise a vibratory densitometer.

The flowmeter assembly 10 includes a pair of flanges 101a and 101b, manifolds 102a and 102b, a driver 104, pick-off sensors 105a and 105b, and flow conduits 103A and 103B. The driver 104 and the pick-off sensors 105a and 105b are connected to the flow conduits 103A and 103B.

The flanges 101a and 101b are affixed to the manifolds 102a and 102b. The manifolds 102a and 102b can be affixed to opposite ends of a spacer 106 in some embodiments. The spacer 106 maintains the spacing between the manifolds 102a and 102b in order to prevent pipeline forces from being transmitted to flow conduits 103A and 103B. When the flowmeter assembly 10 is inserted into a pipeline (not shown) which carries the flow fluid being measured, the flow fluid enters the flowmeter assembly 10 through the flange 101a, passes through the inlet manifold 102a where the total amount of flow fluid is directed to enter the flow conduits 103A and 103B, flows through the flow conduits 103A and 103B and back into the outlet manifold 102b, where it exits the meter assembly 10 through the flange 101b.

The flow fluid can comprise a liquid. The flow fluid can comprise a gas. The flow fluid can comprise a multi-phase fluid, such as a liquid including entrained gases and/or entrained solids.

The flow conduits 103A and 103B are selected and appropriately mounted to the inlet manifold 102a and to the outlet manifold 102b so as to have substantially the same mass distribution, moments of inertia, and elastic modules about the bending axes Wa-Wa and Wb-Wb respectively. The flow conduits 103A and 103B extend outwardly from the manifolds 102a and 102b in an essentially parallel fashion.

The flow conduits 103A and 103B are driven by the driver 104 in opposite directions about the respective bending axes Wa and Wb and at what is termed the first out of phase bending mode of the vibratory flowmeter 5. The driver 104 may comprise one of many well known arrangements, such as a magnet mounted to the flow conduit 103A and an opposing coil mounted to flow conduit 103B. An alternating current is passed through the opposing coil to cause both conduits to oscillate. A suitable drive signal is applied by the meter electronics 20 to the driver 104 via the lead 110. Other driver devices are contemplated and are within the scope of the description and claims.

The meter electronics 20 receives sensor signals on the leads 111a and 111b, respectively. The meter electronics 20 produces a drive signal on the lead 110 which causes the driver 104 to oscillate the flow conduits 103A and 103B. Other sensor devices are contemplated and are within the scope of the description and claims.

The meter electronics 20 processes the left and right velocity signals from the pick-off sensors 105a and 105b in order to compute a flow rate, among other things. The communication path 26 provides an input and an output means that allows the meter electronics 20 to interface with an operator or with other electronic systems. The description of FIG. 1 is provided merely as an example of the operation of a Coriolis flowmeter and is not intended to limit the teaching of the present invention.

The meter electronics 20 in one embodiment is configured to vibrate the flowtubes 103A and 103B. The vibration is performed by the driver 104. The meter electronics 20 further receives resulting vibrational signals from the pickoff sensors 105a and 105b. The vibrational signals comprise vibrational responses of the flowtubes 103A and 103B. The meter electronics 20 processes the vibrational responses and determines a response frequency and/or phase difference. The meter electronics 20 processes the vibrational response and determines one or more flow measurements, including a mass flow rate and/or density of the flow fluid. Other vibrational response characteristics and/or flow measurements are contemplated and are within the scope of the description and claims.

In one embodiment, the flowtubes 103A and 103B comprise substantially U-shaped flowtubes, as shown. Alternatively, in other embodiments, the flowtubes can comprise substantially straight flowtubes or can comprise one or more flowtubes of curved shapes other than U-shaped flowtubes. Additional flowmeter shapes and/or configurations can be used and are within the scope of the description and claims.

Figure 4:
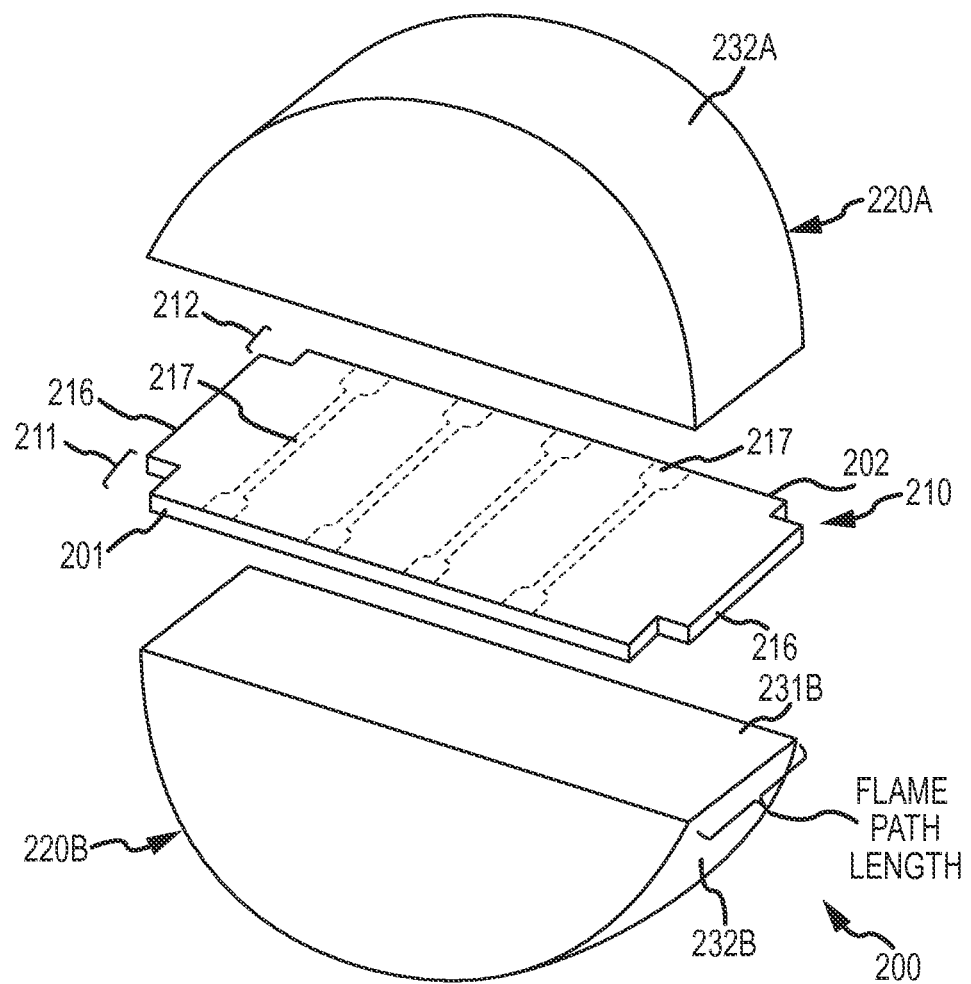
FIG. 4 is an exploded view of a flameproof feed-through according to an embodiment of the invention.

FIG. 4 is an exploded view of a flameproof feed-through 200 according to an embodiment of the invention. The flameproof feed-through 200 in this embodiment includes a feed-through element 210 comprising a substantially planar shape, a first interface region 211, and a second interface region 212, wherein one or more conductors 217 extend between the first interface region 211 and the second interface region 212. The flameproof feed-through 200 further includes one or more body portions 220 assembled to the feed-through element 210, with the one or more body portions 220 holding the feed-through element 210 in position with respect to the aperture. The first interface region 211 of the feed-through element 210 extends at least partially to a first side 201 of the flameproof feed-through 200. The second interface region 212 of the feed-through element 210 extends at least partially to a second side 202 of the flameproof feed-through 200.

In the embodiment shown in the figure, two or more body portions 220 may be employed, such as first and second body portions 220A and 220B. Alternatively, in other embodiments, a single body portion 220 may be employed. In another alternative embodiment, more than two body portions 220 may be assembled together to form the flameproof feed-through 200.

When the flameproof feed-through 200 of this embodiment is assembled, the feed-through element 210 is clamped between the first body portion 220A and the second body portion 220B. Assembly of the first body portion 220A, the feed-through element 210, and the second body portion 220B creates a substantially flameproof interface between the feed-through element 210 and the first and second body portions 220A and 220B. The first and second body portions 220A and 220B are configured to fit into and substantially block the aperture (see, for example, FIG. 5).

The aperture may comprise an aperture in a barrier, wall, or other partition. Alternatively, the aperture may comprise an aperture in a shell, chamber, or housing. The aperture may require the use of a feed-through that transfers electrical power and/or electrical signals between two sides or between a chamber and the exterior of the chamber.

The feed-through element 210 may comprise a substantially planar shape in some embodiments. The feed-through element 210 includes substantially flat or planar surfaces that may be clamped against by the first body portion 220A and the second body portion 220B. However, the feed-through element 210 may be formed in any desired or needed shape. The feed-through element 210 includes a first interface region 211 and a second interface region 212. In some embodiments, the second interface region 212 may be substantially opposite the first interface region 211. However, this is not required and the second interface region 212 may be at any position/orientation with respect to the first interface region 211.

The feed-through element 210 includes one or more conductors 217 extending from the first interface region 211 to the second interface region 212. The one or more conductors 217 may comprise external conductors formed on an outer surface of the feed-through element 210. Alternatively, the one or more conductors 217 may comprise one or more internal conductors formed partially or completely within the feed-through element 210. The one or more conductors 217 may conduct electricity and/or electrical signals between the first interface region 211 and the second interface region 212.

The feed-through element 210 may comprise an electrical insulator material. The feed-through element 210 may comprise a non-flammable or flame or heat-resistant material. In some embodiments, the feed-through element 210 may comprise a printed circuit board (PCB). The one or more conductors 217 may be formed on outside surfaces of the feed-through element 210 or may be located partially or completely inside the feed-through element 210.

Figure 5:
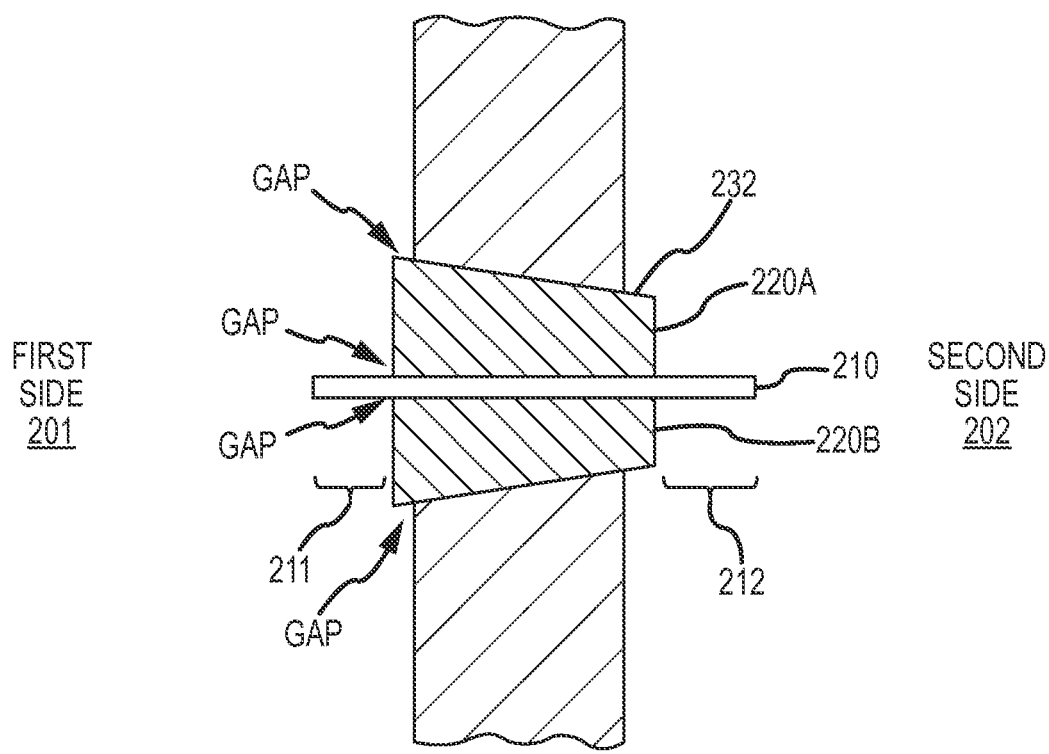
FIG. 5 shows the flameproof feed-through in position in an aperture according to an embodiment of the invention.

When the feed-through element 210 of the figure is clamped between the first body portion 220A and the second body portion 220B, the first interface region 211 extends at least partially from a first side 201 and the second interface region 212 extends at least partially from a second side 202 (see FIG. 5). As a result, the ends of the one or more conductors 217 at the first interface region 211 are exposed to be electrically contacted or coupled. Similarly, the ends of the one or more conductors 217 at the second interface region 212 are likewise exposed to be electrically contacted or coupled. A first electrical connector (or similar device) may be assembled or affixed to the first interface region 211 and the conductors there. A second electrical connector (or similar device) may be assembled or affixed to the second interface region 212 and the conductors there.

Assembly of the first body portion 220A, the feed-through element 210, and the second body portion 220B creates a substantially flameproof interface between the feed-through element 210 and the first and second body portions 220A and 220B when the first and second body portions 220A and 220B are clamped to the feed-through element 210. Assembly of the flameproof feed-through 200 will provide a potential flame path on either side of the feed-through element 210. The potential flame path has a flame path length that equals the thickness of the first and second body portions 220A and 220B on their contact faces 231A and 231B (i.e., where the first and second body portions 220A and 220B contact the feed-through element 210). It is important that a gap between the two contact faces 231A and 231B and the feed-through element 210 be minimized. A flame path between the feed-through element 210 and a body portion 220 will depend on both a gap size and a flame path length. Compliance with a flame proof standard may require maintaining a small gap, a long flame path length, or both.

The flame path length may be selected so that a flame may not propagate from one side of the flameproof feed-through 200 to the other side with sufficient heat or energy content to cause ignition, given a gap between the feed-through element 210 and the first and second body portions 220A and 220B that is less than a predetermined allowable gap.

The fit between the body portions 220A and 220B and the feed-through element 210 is very important. It is desired that gaps do not exist. Gaps may allow gasses to leak through and therefore may allow possible ignition of the gas or gasses. Gaps may allow ignition products to propagate through the joint. Consequently, both the feed-through element 210 and the contact faces 231A and 231B are substantially smooth and regular, i.e., to within a predetermined surface finish.

In addition, it may be important for an exterior surface 232 of the body portions 220 to fit to the aperture. It is highly desirable that a gap between the body portions 220 and the interior surface of the aperture achieve one or both of a minimal gap and a suitable flame path length.

In some assembly method embodiments, the one or more body portions 220 are assembled to the feed-through element 210 in order to form a spigot-type joint. The assembled flameproof feed-through 200 is then planed, milled, ground, etched, turned, or otherwise processed to where a perimeter of the assembled flameproof feed-through 200 achieves a predetermined gap with the interior of the aperture. In other words, an exterior surface or surfaces of the assembled flameproof feed-through 200 is processed to achieve a gap with the aperture that is less than a predetermined allowable gap.

In some assembly method embodiments, the circumferential surface 232 of the one or more body portions 220 and feed-through edges 216 of the feed-through element 210 may be machined to a predetermined size. The circumferential surfaces 232A and 232B of the two or more body portions 220A and 220B and the feed-through edges 216 of the feed-through element 210 may be machined to a predetermined size to create a substantially flameproof interface between the flameproof feed-through 200 and the aperture. The feed-through edges 216 of the feed-through element 210 may be machined to be substantially flush with the circumferential surfaces 232A and 232B of the two or more body portions 220A and 220B.

In some assembly method embodiments, the feed-through element 210 is machined to a predetermined profile tolerance. The predetermined profile tolerance may include a predetermined surface flatness. The predetermined profile tolerance may include a predetermined surface smoothness. For example, one or both of the feed-through element 210 and the cross-aperture flanges 230A and 230B (see FIG. 6) may be planed down or otherwise machined in order to achieve a substantially flameproof interface when assembled, i.e., to achieve a gap between a body portion 220 and the feed-through element 210 that is less than a predetermined allowable gap. The machining may also be done to achieve an external surface tolerance and minimal gap fit with the aperture. The machining may also include machining the contact faces 231A and 231B of the two or more body portions 220A and 220B (see FIG. 4). Where the one or more body portions 220 comprise a single body portion 220, the feed-through element 210 is machined to a predetermined profile tolerance, wherein a substantially flameproof flange-type interface is created between the feed-through element 210 and a surface surrounding the aperture.

In either assembly method embodiment, one or both of the body portions 220 and the feed-through element 210 may be machined to achieve a predetermined surface smoothness and/or to achieve a gap that is less than a predetermined allowable gap. For example, the feed-through element 210 and/or the two or more body portions 220A and 220B may be manufactured to be thicker than desired and then the assembled flameproof feed-through 200 may be planed, milled, etched, ground, or otherwise processed until the flameproof feed-through 200 comprises a desired perimeter size and shape and a desired uniformity. The feed-through element 210 and/or the two or more body portions 220A and 220B may be machined to achieve one or more of a predetermined perimeter size, a predetermined perimeter shape, and/or a predetermined perimeter surface smoothness and/or uniformity.

In addition to performing a flameproof sealing function, the feed-through element 210 may also provide an electrical interface that provides a predetermined impedance characteristic for the one or more conductors 217. It should be understood that the impedance characteristics of individual conductors 217 may be the same or maybe different. The one or more conductors 217 of the feed-through element 210 may be precisely formed. The one or more conductors 217 may be formed of predetermined thicknesses and predetermined widths. The one or more conductors 217 may be formed in predetermined geometric shapes or patterns and may include a ground plane or ground planes. The one or more conductors 217 may be formed of predetermined conductor compositions. Further, the one or more conductors 217 may be formed to have a predetermined DC resistance and/or a predetermined AC impedance. This may comprise including any manner of passive and/or active electrical components as part of either the feed-through element 210 or as part of subsequent electrical circuits. Further, in some embodiments the flameproof feed-through 200 may include interchangeable feed-through elements 210 of various impedances/resistances. As a result, the flameproof feed-through 200 can be assembled to comprise a desired impedance/resistance from among a plurality of possible impedances/resistances.

In some embodiments, the feed-through element 210 may be at least partially flexible. In a flexible embodiment, the feed-through element 210 will be configured to be clamped between the two body portions 220A and 220B and may extend from the outward barrier side 201 and from the inward barrier side 202 in any orientation. For example, in some embodiments the feed-through element 210 may comprise a flexible member that is similar to a ribbon cable.

In some embodiments, the flameproof feed-through 200 may additionally include a seal or seals (not shown) between the body portions 220 and the feed-through element 210. The flameproof feed-through 200 may include a seal or seals (not shown) between the body portions 220 and an inner surface of the aperture.

The seal or seals may comprise a solid seal or seals, such as O-rings, gaskets, or other components that may be clamped between the components. Alternatively, the seal or seals may comprise a liquid, paste, grease, or other material that does not have a predetermined shape and that can be applied to one or more of the components of the flameproof feed-through 200. The seal or seals may comprise a material that does not substantially change. Alternatively, the seal or seals may comprise a material that hardens, cures, or otherwise transforms or is transformed during or after the assembly process.

FIG. 5 shows the flameproof feed-through 200 in position in an aperture according to an embodiment of the invention. The flameproof feed-through 200 in this embodiment forms a spigot joint. A circumferential surface 232 of the flameproof feed-through 200 fits to an interior surface of the aperture and with the resulting gap being designed to be less than a predetermined gap threshold. The predetermined gap threshold, along with the flame path length, must meet a flameproof standard.

The flameproof feed-through 200 may have straight sides or may be tapered. A tapered flameproof feed-through 200 may be more resistant to being dislodged, such as where a pressure differential exists between the first side 201 and the second side 202. This tapered feature may also provide ease of assembly of the product.

The flameproof feed-through 200 also includes a gap between the first body portion 220A and the feed-through element 210 and a gap between the feed-through element 210 and the second body portion 220B.

As can be seen in this figure, the feed-through element 210 extends through the flameproof feed-through 200. The feed-through element 210 projects out into both the first side 201 and the second side 202. As a result, the first interface region 211 of the feed-through element 210 extends at least partially to the first side 201 and the second interface region 212 extends at least partially to the second side 202.

Figure 6:
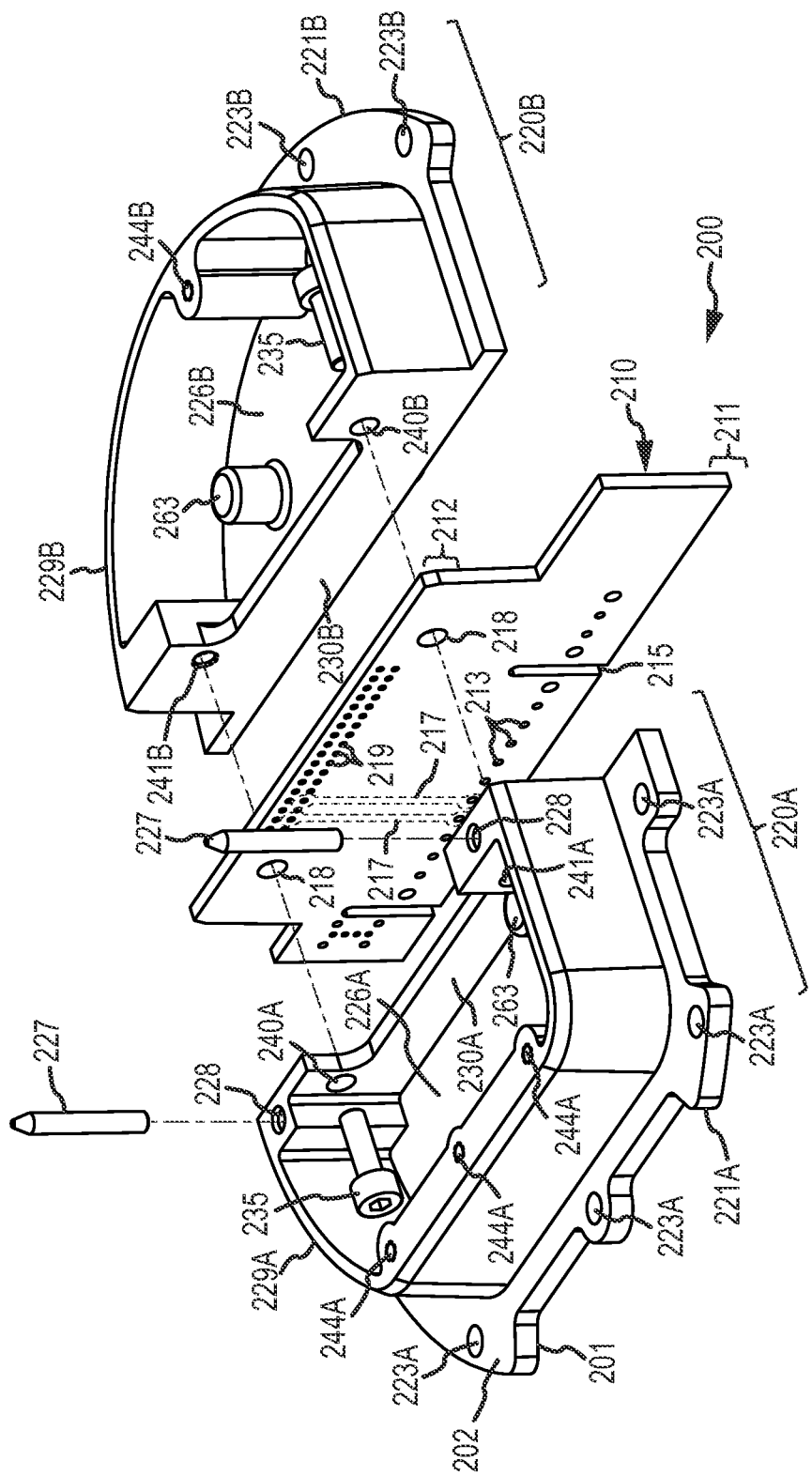
FIG. 6 is an exploded view of a flameproof feed-through according to another embodiment of the invention.

FIG. 6 is an exploded view of the flameproof feed-through 200 according to another embodiment of the invention. The flameproof feed-through 200 in the embodiment shown comprises the feed-through element 210, the first body portion 220A, and at least the second body portion 220B.

In this embodiment, the feed-through element 210 may include one or more slots 215. The one or more slots 215 may function to provide alignment of a connector or other component.

In this embodiment, the feed-through element 210 may include one or more fastener apertures 218. The one or more fastener apertures 218 may be located at the second interface region 212, as shown. The one or more fastener apertures 218 may receive one or more corresponding fasteners 235 that fasten together the first body portion 220A and the second body portion 220B. It should be noted that the one or more fastener apertures 218 may be located so as to not provide a shortened flame path that would avoid the full flame path length along the feed-through element 210.

In this embodiment, the feed-through element 210 may include one or more first apertures 213. The one or more first apertures 213 may be located in the first interface region 211. The one or more first apertures 213 may receive electrical conductors of any manner or may receive a connector or other component. The one or more first apertures 213 may include any manner of pads, through-plating, or other conductor coupling feature.

In this embodiment, the feed-through element 210 may include one or more second apertures 219 in the second interface region 212. The one or more second apertures 219 may receive electrical conductors of any manner or may receive a connector or other component. The one or more second apertures 219 may include any manner of pads, through-plating, or other conductor coupling feature. The one or more conductors 217 may extend between the one or more first apertures 213 and the one or more second apertures 219 in some embodiments.

In this embodiment, the first and second body portions 220A and 220B include outwardly extending mounting flanges 221A and 221B. The mounting flanges 221A and 221B may be configured to be attached to a surface (or surfaces) surrounding the aperture. The mounting flanges 221A and 221B may be configured to prevent the first and second body portions 220A and 220B from passing too far into or through the aperture. The mounting flanges 221A and 221B may include one or more fastener apertures 223 for fastening the mounting flanges 221A and 221B to an aperture surface portion. Any manner of suitable fasteners may be inserted through the one or more fastener apertures 223.

In this embodiment, the first and second body portions 220A and 220B may include aperture flanges 229A and 229B that extend at least partially into the aperture. The aperture flanges 229A and 229B may correspond with, and fit to, a sidewall or sidewalls of the aperture. The aperture flanges 229A and 229B substantially correspond to the shape of the aperture.

The perimeter flange 229 may include one or more fastener apertures 228. Alternatively, the apertures 228 may comprise one or more alignment apertures 228 for receiving one or more alignment dowels 227.

The body portions 220A and 220B include cross-aperture flanges 230A and 230B that are configured to clamp against opposite sides of the feed-through element 210. The cross-aperture flanges 230A and 230B extend substantially across the middle region of the aperture. In some embodiments, the cross-aperture flanges 230A and 230B may approximately bisect the aperture, although it should be understood that the cross-aperture flanges 230A and 230B may be positioned at any location in the aperture.

The cross-aperture flanges 230A and 230B may include clearance fastener apertures 240A and 240B and may include engagement fastener apertures 241A and 241B. The clearance fastener apertures 240 may alternate with the engagement fastener apertures 241, wherein a fastener 235 passes through a clearance fastener aperture 240 in one body portion 220 and engages an engagement fastener aperture 241 in the other body portion 220. The engagement fastener apertures 241 in some embodiments may comprise threaded apertures and the fastener 235 may comprise a threaded fastener.

The first and second body portions 220A and 220B include face plates 226A and 226B configured to extend across and block the barrier aperture. The face plates 226A and 226B may extend between the aperture flanges 229A and 229B and the cross-aperture flanges 230A and 230B.

The first and second body portions 220A and 220B may include other alignment or fastener features, such as the features 263. The features 263 may include recesses and/or projections that receive or cooperate with a component or components on the first side 201 of the flameproof feed-through 200.

When assembled, the feed-through element 210 is clamped between the first and second body portions 220A and 220B and the feed-through element 210 is positioned so that the first interface region 211 extends at least partially from the first side 201 of the assembled flameproof feed-through 200 and the second interface region 212 extends at least partially from the second side 202 of the assembled flameproof feed-through 200. A first electrical connector (or similar device) may be assembled or affixed to the first interface region 211 and the conductors there. A second electrical connector (or similar device) may be assembled or affixed to the second interface region 212 and the conductors there. Fasteners 235 may be inserted through the clearance apertures 240A and 240B, with the fasteners 235 engaging the engaging apertures 241A and 241B and performing the clamping together of the first body portion 220A and the second body portion 220B. The fasteners 235 may additionally ensure positional alignment of each body even after the machining operation.

As previously discussed, the feed-through element 210 may be clamped between the two or more body portions 220A and 220B and then the assembled flameproof feed-through 200 may be planed, milled, ground, etched, turned, or otherwise processed to where a perimeter of the assembled flameproof feed-through 200 achieves a predetermined allowable gap with the interior of the aperture. Alternatively, as previously discussed, one or both of the feed-through element 210 and the cross-aperture flanges 230A and 230B may be machined in order to achieve a substantially flameproof interface when assembled, i.e., to achieve a gap between a body portion 220 and the feed-through element 210 that is less than a predetermined gap threshold and/or to achieve an external surface tolerance and minimal gap fit with the aperture. In either assembly method embodiment, one or both of the body portions 220 and the feed-through element 210 may be machined to achieve a gap that is less than a predetermined gap threshold.

Figure 7:
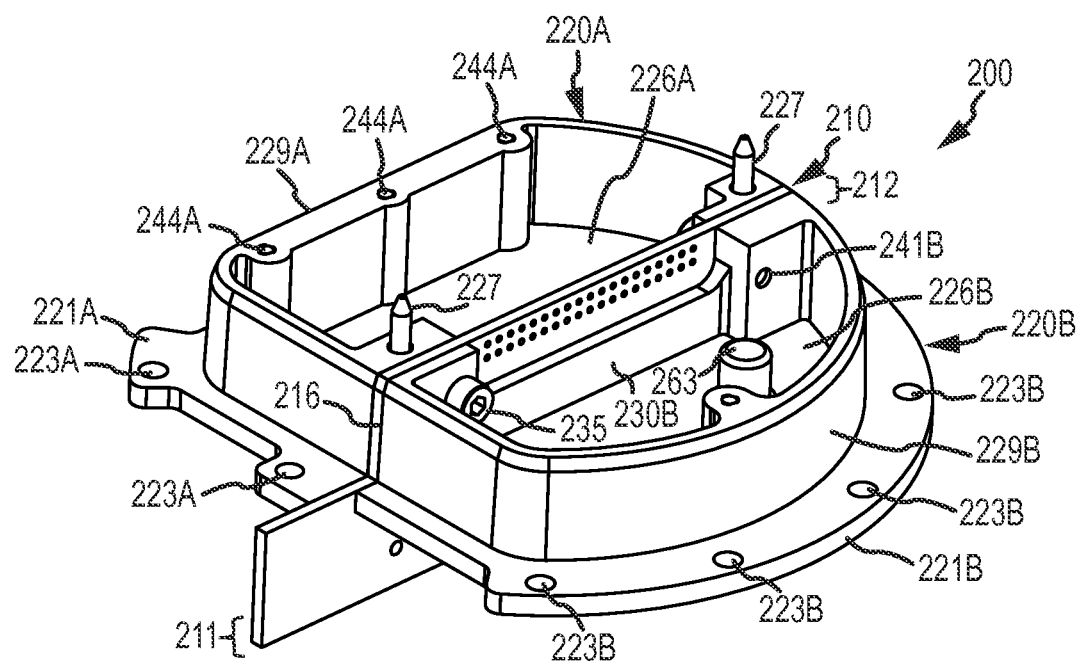
FIG. 7 shows the first and second body portions assembled to the feed-through element of FIG. 6.

FIG. 7 shows the first and second body portions 220A and 220B assembled to the feed-through element 210 of FIG. 6. It can be seen that no substantial gap or flame path exists between the feed-through element 210 and the second cross-aperture flange 230B. The assembled flameproof feed-through 200 is ready to be placed in an aperture.

Figure 8:
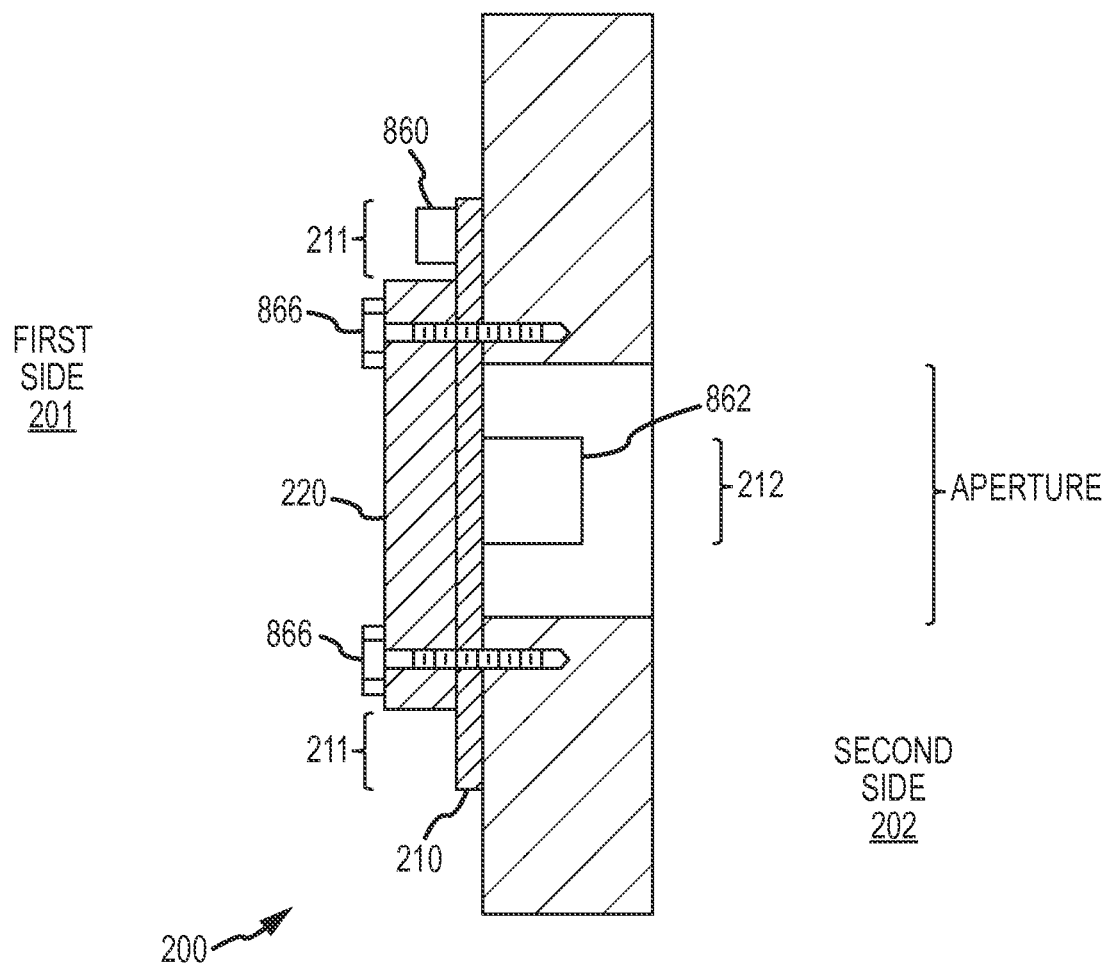
FIG. 8 shows the flameproof feed-through according to another embodiment of the invention.

FIG. 8 shows the flameproof feed-through 200 according to another embodiment of the invention. The flameproof feed-through 200 includes a body portion 220 and a feed-through element 210. The flameproof feed-through 200 in this embodiment forms a flange joint. In this embodiment of the flameproof feed-through 200, the one or more body portions 220 comprise a single body portion 220. The feed-through element 210 is machined to a predetermined profile tolerance, wherein a substantially flameproof flange-type interface is created between the feed-through element 210 and a surface surrounding the aperture.

The body portion 220 overlaps the aperture and may be located on a side of the aperture surface (shown on the first side 201 for purpose of illustration only). The body portion 220 may have any suitable thickness and may be formed of any suitable material, as previously discussed. The body portion 220 may maintain structural integrity even where a high pressure differential exists between the first side 201 and the second side 202.

The body portion 220 may have a shape that corresponds to the shape of the aperture, wherein the body portion 220 is round if the aperture is round, for example. In some embodiments, the shape of the body portion 220 corresponds to the shape of the aperture so that the body portion 220 maintains a substantially constant and uniform overlap of the aperture. In some embodiments, the body portion 220 may completely block the aperture. Alternatively, the body portion 220 may differ in shape from the aperture.

The feed-through element 210 likewise overlaps the aperture, although the overlap by the feed-through element 210 is not limited to corresponding to the overlap by the body portion 220. The feed-through element 210 is clamped between the body portion 220 and the surface surrounding the aperture, wherein the feed-through element 210 blocks the aperture and provides a flameproof closure of the aperture.

The flameproof feed-through 200 may include one or more fasteners 866 that hold the body portion 220 to a surface surrounding the aperture. The one or more fasteners 866 may clamp the feed-through element 210 between the body portion 220 and the surrounding aperture surface, as shown. Consequently, both the body portion 220 and the feed-through element 210 may include one or more corresponding apertures that allow the one or more fasteners 866 to engage the surface surrounding the aperture.

The feed-through element 210 may have any suitable thickness and may be formed of any suitable material, as previously discussed. The feed-through element 210 may include one or more conductors 217, as previously discussed. The feed-through element 210 may have a shape that corresponds to the shape of the aperture. Alternatively, the feed-through element 210 may differ in shape from the aperture. However, the feed-through element 210 overlaps the aperture, and overlaps the aperture completely, with no portions of the aperture remaining uncovered.

The feed-through element 210 includes a first interface region (or regions) 211 that extends at least partially out from the body portion 220 at the first side 201. The first interface region 211 may include or receive an electrical connector 860 or other suitable component.

The feed-through element 210 includes a second interface region 212 that is within the aperture and extends at least partially out from the feed-through element 210 at the second side 201. The second interface region 212 is accessible to the second side 202 of the flameproof feed-through 200. The second interface region 212 may include or receive an electrical connector 862 or other suitable component.

The flameproof feed-through 200 and method according to the invention can be employed according to any of the embodiments in order to provide several advantages, if desired. The flameproof feed-through 200 may prevent a flame from passing through an aperture. The flameproof feed-through 200 may provide a constant and/or predetermined electrical impedance. The flameproof feed-through 200 may comprise a small tolerance or small gap feed-through that can be economically and reliably manufactured.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention. Accordingly, the scope of the invention should be determined from the following claims.

What is claimed is:

1. A flameproof feed-through (200) adapted for use with an aperture, with the flameproof feed-through (200) comprising:
  a feed-through element (210) comprising a substantially planar shape, a first interface region (211), and a second interface region (212) oriented to face in a different direction relative to the first interface region (211), wherein one or more conductors (217) extend between the first interface region (211) and the second interface region (212); and
  one or more body portions (220) assembled to the feed-through element (210), with the one or more body portions (220) holding the feed-through element (210) in position with respect to the aperture;
  wherein the first interface region (211) of the feed-through element (210) extends at least partially to a first side (201) of the flameproof feed-through (200) and wherein the second interface region (212) of the feed-through element (210) extends at least partially to a second side (202) of the flameproof feed-through (200), with both a circumferential surface (232) of the one or more body portions (220) and feed-through edges (216) of the feed-through element (210) being a predetermined perimeter size and shape to be substantially flush with each other and with the aperture to create a substantially flameproof interface between the flameproof feed-through (200) and the aperture.

2. The flameproof feed-through (200) of claim 1, with the feed-through element (210) comprising a printed circuit board (PCB) (210).

3. The flameproof feed-through (200) of claim 1, with the one or more conductors (217) comprising one or more internal or external conductors (217).

4. The flameproof feed-through (200) of claim 1, with the feed-through element (210) designed to provide a predetermined impedance characteristic for the one or more conductors (217) based on at least one of thickness, width, geometric shape, conductor composition of the feed-through element.

5. The flameproof feed-through (200) of claim 1, with the feed-through element (210) comprising a predetermined profile tolerance.

6. The flameproof feed-through (200) of claim 1, with the one or more body portions (220) comprising two or more body portions (220A, 220B) and with the feed-through edges (216) of the feed-through element (210) being substantially flush with circumferential surfaces (232A, 232B) of the two or more body portions (220A, 220B).

7. The flameproof feed-through (200) of claim 1, with the one or more body portions (220) comprising two or more body portions (220A, 220B) clamping against the feed-through element (210) to form a spigot-type joint, with circumferential surfaces (232A, 232B) of the two or more body portions (220A, 220B) and with feed-through edges (216) of the feed-through element (210) being the predetermined perimeter size and shape to create a substantially flameproof interface between the flameproof feed-through (200) and the aperture.

8. The flameproof feed-through (200) of claim 1, with the one or more body portions (220) comprising two or more body portions (220A, 220B) clamping against the feed-through element (210) to form a spigot-type joint, with circumferential surfaces (232A, 232B) of the two or more body portions (220A, 220B), and with the feed-through element (210) being machined to a predetermined profile tolerance to create a substantially flameproof interface between the feed-through element (210) and the two or more body portions (220A, 220B).

9. The flameproof feed-through (200) of claim 1, with the one or more body portions (220) comprising a single body portion (220) and with the feed-through element (210) being machined to a predetermined profile tolerance, wherein a substantially flameproof flange-type interface is created between the single body portion (220), the feed-through element (210), and a surface surrounding the aperture.

10. A method of forming a flameproof feed-through adapted for use with an aperture, with the method comprising:
providing a feed-through element comprising a substantially planar shape, a first interface region, and a second interface region oriented to face in a different direction relative to the first interface region (211), wherein one or more conductors extend between the first interface region and the second interface region; and
assembling one or more body portions to the feed-through element, with the one or more body portions holding the feed-through element in position with respect to the aperture;
wherein the first interface region of the feed-through element extends at least partially to a first side of the flameproof feed-through and wherein the second interface region of the feed-through element extends at least partially to a second side of the flameproof feed-through, with both a circumferential surface (232) of the one or more body portions (220) and feed-through edges (216) of the feed-through element (210) being a predetermined perimeter size and shape to be substantially flush with each other and with the aperture to create a substantially flameproof interface between the flameproof feed-through (200) and the aperture.

11. The method of claim 10, with the feed-through element comprising a printed circuit board (PCB).

12. The method of claim 10, with the one or more conductors comprising one or more internal or external conductors.

13. The method of claim 10, with the feed-through element providing a predetermined impedance characteristic for the one or more conductors.

14. The method of claim 10, further comprising machining the feed-through element to a predetermined profile tolerance.

15. The method of claim 10, with the one or more body portions comprising two or more body portions and further comprising machining feed-through edges of the feed-through element to be substantially flush with circumferential surfaces of the two or more body portions.

16. The method of claim 10, with the one or more body portions comprising two or more body portions and with the assembling further comprising:
clamping the two or more body portions against the feed-through element to form a spigot-type joint, and
machining circumferential surfaces of the two or more body portions and feed-through edges of the feed-through element to the predetermined perimeter size and shape to create the substantially flameproof interface between the flameproof feed-through and the aperture.

17. The method of claim 10, with the one or more body portions comprising two or more body portions and with the assembling further comprising:
machining the feed-through element to a predetermined profile tolerance to create a substantially flameproof interface between the feed-through element and the two or more body portions clamping the two or more body portions against the feed-through element to form a spigot-type joint; and
machining circumferential surfaces of the two or more body portions and feed-through edges of the feed-through element to the predetermined perimeter size and shape to create the substantially flameproof interface between the flameproof feed-through and the aperture.

18. The method of claim 10, with the one or more body portions comprising a single body portion and with the method further comprising machining the feed-through element to a predetermined profile tolerance, wherein a substantially flameproof flange-type interface is created between the single body portion, the feed-through element, and a surface surrounding the aperture.

* * * * *